(12) United States Patent
Pal et al.

(10) Patent No.: US 9,979,038 B2
(45) Date of Patent: May 22, 2018

(54) SYSTEM AND METHOD FOR ENERGY STORAGE AND RECOVERY

(75) Inventors: Uday B. Pal, Dover, MA (US); Srikanth Gopalan, Westborough, MA (US)

(73) Assignee: Trustees of Boston University, Boston, MA (US)

( * ) Notice: Subject to any disclaimer, the term of this patent is extended or adjusted under 35 U.S.C. 154(b) by 1491 days.

(21) Appl. No.: 13/700,095

(22) PCT Filed: May 24, 2011

(86) PCT No.: PCT/US2011/037698
§ 371 (c)(1),
(2), (4) Date: Mar. 27, 2013

(87) PCT Pub. No.: WO2011/149908
PCT Pub. Date: Dec. 1, 2011

(65) Prior Publication Data
US 2013/0183597 A1    Jul. 18, 2013

Related U.S. Application Data

(60) Provisional application No. 61/347,519, filed on May 24, 2010.

(51) Int. Cl.
*H01M 8/12* (2016.01)
*H01M 8/06* (2016.01)
(Continued)

(52) U.S. Cl.
CPC .............. *H01M 8/12* (2013.01); *C25B 1/04* (2013.01); *C25B 11/0457* (2013.01);
(Continued)

(58) Field of Classification Search
CPC ...... H01M 8/12; H01M 8/0656; H01M 8/0662
(Continued)

(56) References Cited

U.S. PATENT DOCUMENTS

| 4,204,033 A | 5/1980 | Meissner |
| 5,492,777 A | 2/1996 | Isenberg et al. |

(Continued)

FOREIGN PATENT DOCUMENTS

| JP | 2007051328 A | 3/2007 |
| WO | WO-2011/149908 A2 | 12/2011 |

OTHER PUBLICATIONS

International Search Report and Written Opinion issued by the Korean Intellectual Property Office as International Searching Authority for International Application No. PCT/US2011/037698 dated Jan. 4, 2012 (7 pages).

*Primary Examiner* — Osei K Amponsah
(74) *Attorney, Agent, or Firm* — Wilmer Cutler Pickering Hale and Dorr LLP

(57) ABSTRACT

System and method for energy storage and recovery is described. More particularly, system and method using tungsten based materials to electrochemically store and recover energy is described. In certain embodiments, the system includes a reversible solid oxide electrochemical cell (RSOEC) having a porous cathode, a porous anode, and an electrolyte capable of transporting oxygen ion. The system further includes a reactor comprising tungsten, tungsten oxide, or combinations thereof. To store the energy, the RSOEC is capable of receiving electricity to electrolyze $H_2O$ to generate $H_2$ and $O_2$ and the reactor is operably connected to the RSOEC to receive the generated H2 and convert tungsten oxide to tungsten thereby storing electrical energy. To recover the energy, reactor is capable of receiving $H_2O$ to convert tungsten to tungsten oxide and generate $H_2$ (Continued)

and the RSOEC is operably connected to the reactor to receive the generated H$_2$ and generate electrical energy.

6 Claims, 17 Drawing Sheets

(51) Int. Cl.
| | |
|---|---|
| *H01M 8/0656* | (2016.01) |
| *H01M 8/0662* | (2016.01) |
| *H01M 8/18* | (2006.01) |
| *C25B 11/04* | (2006.01) |
| *C25B 15/08* | (2006.01) |
| *C25B 1/04* | (2006.01) |
| *H01M 8/124* | (2016.01) |

(52) U.S. Cl.
CPC ............ *C25B 15/08* (2013.01); *H01M 8/0656* (2013.01); *H01M 8/0662* (2013.01); *H01M 8/186* (2013.01); *H01M 2008/1293* (2013.01); *Y02E 60/366* (2013.01); *Y02E 60/528* (2013.01)

(58) Field of Classification Search
USPC ........................................ 429/422, 495, 408
See application file for complete search history.

(56) References Cited

U.S. PATENT DOCUMENTS

| | | | |
|---|---|---|---|
| 5,885,727 A * | 3/1999 | Kawatsu | ............... H01M 4/926 |
| | | | 429/411 |
| 2004/0180249 A1 | 9/2004 | Pham et al. | |
| 2005/0053812 A1* | 3/2005 | Hickey | ............... H01M 4/8621 |
| | | | 429/411 |
| 2009/0130505 A1 | 5/2009 | McElroy | |
| 2010/0248056 A1* | 9/2010 | Yaguchi | ............ H01M 8/04007 |
| | | | 429/434 |

* cited by examiner

SYSTEM AND METHOD FOR ENERGY STORAGE AND RECOVERY

CROSS-REFERENCE(S) TO RELATED APPLICATIONS

The present application is a national stage application of International Application No. PCT/US2011/037698, filed on May 24, 2011, which claims the benefit of U.S. Patent Application No. 61/347,519, filed on May 24, 2010, the contents of which are hereby incorporated by reference herein in their entireties.

FIELD OF THE INVENTION

The present invention relates to electrochemical energy storage and recovery. More particularly, the present invention relates to use of tungsten based materials to electrochemically store and recover energy.

BACKGROUND OF THE INVENTION

The US electrical energy generating capacity is 1,088 GW and the storage capacity is 22 GW. Most of this storage capacity (99%) is provided by "pumped hydro" energy storage systems. Such systems store energy in the form of potential energy during off-peak hours and convert the stored energy to electricity during peak hours. However, such systems have several distinct disadvantages: (1) they require a large volume to store energy leading to a low volumetric energy density; (2) they are highly dependent on geography or geology and provides little siting flexibility; (3) has low energy efficiency because storage and recovery of electrical energy relies conversion between electrical energy and mechanical energy (i.e., incurs frictional losses); and (4) they can be slow to react to changing energy demand conditions to store and provide electricity in the minutes to hour time scale.

SUMMARY OF THE INVENTION

In accordance with certain embodiments, an apparatus for storing and recovering electrical energy is described. The apparatus can include a reversible solid oxide electrochemical cell (RSOEC) that includes a porous cathode, a porous anode, and an electrolyte capable of transporting oxygen ions; a reactor that includes a powder bed that includes tungsten, tungsten oxide, or combinations thereof.

In certain embodiments, the RSOEC is capable of receiving electrical energy to electrolyze $H_2O$ to generate $H_2$ and $O_2$ and the reactor is operably connected to the RSOEC to receive the generated $H_2$ and convert tungsten oxide to tungsten thereby storing electrical energy.

In certain embodiments, the reactor is capable of receiving $H_2O$ to convert tungsten to tungsten oxide and generate $H_2$ and the RSOEC is operably connected to the reactor to receive the generated $H_2$ and generate electrical energy and $H_2O$ thereby recovering electrical energy.

In certain embodiments, the reactor generates $H_2O$ when tungsten oxide is converted to tungsten and the RSOEC generates $H_2O$ when electrical energy is generated and the apparatus further includes a reservoir to store the generated $H_2O$.

In certain embodiments, the reactor generates $H_2O$ when tungsten oxide is converted to tungsten and the apparatus further includes a conduit to recirculate the generated $H_2O$ to the RSOEC.

In certain embodiments, the RSOEC generates $H_2O$ when electrical energy is generated and the apparatus further includes a conduit to recirculate the generated $H_2O$ to the reactor.

In certain embodiments, the reactor and the RSOEC are operated at a temperature between about 600° C. to about 1000° C.

In certain embodiments, the reactor and the RSOEC are operated at a temperature between about 800° C. to about 850° C.

In certain embodiments, the apparatus further includes a heat exchanger, where the heat exchanger receives heat from the reactor when the reactor receives $H_2O$ to convert tungsten to tungsten oxide and generate $H_2$ and receives heat from the RSOEC when the RSOEC generates electrical energy and $H_2O$.

In certain embodiments, the apparatus further includes a heat exchanger, where the heat exchanger provides heat to the RSOEC when the RSOEC electrolyzes $H_2O$ to generate $H_2$ and $O_2$; and provides heat to the reactor when the reactor converts tungsten oxide to tungsten.

In certain embodiments, an apparatus having an electrochemical cell that includes a porous cathode, a porous anode, and an electrolyte capable of transporting oxygen ions; a reactor that includes a power bed that includes tungsten, tungsten oxide, or combinations thereof; where the RSOEC is capable of receiving electricity to electrolyze $H_2O$ to generate $H_2$ and $O_2$ and the reactor is operably connected to the RSOEC to receive the generated $H_2$ and convert tungsten oxide to tungsten thereby storing energy is described.

In certain embodiments, the reactor generates $H_2O$ when tungsten oxide is converted to tungsten and the apparatus further includes a reservoir to store the generated $H_2O$.

In certain embodiments, the reactor generates $H_2O$ when tungsten oxide is converted to tungsten and the apparatus further includes a conduit to recirculate the generated $H_2O$ to the RSOEC.

In certain embodiments, the reactor and the electrochemical cell are operated at a temperature between about 800° C. to about 850° C.

In certain embodiments, the apparatus further includes a heat exchanger, where the heat exchanger provides heat to the RSOEC when the RSOEC electrolyzes $H_2O$ to generate $H_2$ and $O_2$ and provides heat to the reactor when the reactor converts tungsten oxide to tungsten.

In certain embodiments, a method for storing electrical energy is described. The method can include providing an electrical energy and $H_2O$ to an electrochemical cell to generate $H_2$; and contacting tungsten oxide in a reactor with the generated $H_2$ to generate tungsten at a temperature between about 600° C. to about 1000° C. to store electrical energy in the form of tungsten.

In certain embodiments, contacting tungsten oxide with the $H_2$ can further generate $H_2O$ and the method can further include recirculating the generated $H_2O$ to the electrochemical cell.

In certain embodiments, the method can further include repeating the providing, contacting, and recirculating until a predetermined amount of electrical energy has been stored as chemical potential energy in tungsten-containing material.

In certain embodiments, the temperature can be between about 800° C. to about 850° C.

In certain embodiments, the electrical energy can be received from an electricity generating apparatus.

In certain embodiments, the method can further include providing heat to the electrochemical cell and the reactor.

In certain embodiments, a method for recovering electrical energy is described. The method can include contacting tungsten with $H_2O$ to generate tungsten oxide and $H_2$ at a temperature between about 600° C. to about 1000° C.; and providing generated $H_2$ to a fuel cell for reaction with $O_2$ to generate electrical energy.

In certain embodiments, the providing generated $H_2$ to a fuel cell for reaction with $O_2$ to generate electrical energy further generates $H_2O$ and the method further includes recirculating the generated $H_2O$ for use during said contacting.

In certain embodiments, the method further includes repeating the contacting, providing, and recirculating until a predetermined amount of electrical energy has been generated by the fuel cell.

In certain embodiments, the temperature is between about 800° C. to about 850° C.

In certain embodiments, the electrical energy generated by the fuel cell is distributed to a power grid or directly to a user.

In certain embodiments, the contacting and the providing are exothermic reactions and the heat generated from the exothermic reactions is stored in a heat exchanger.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
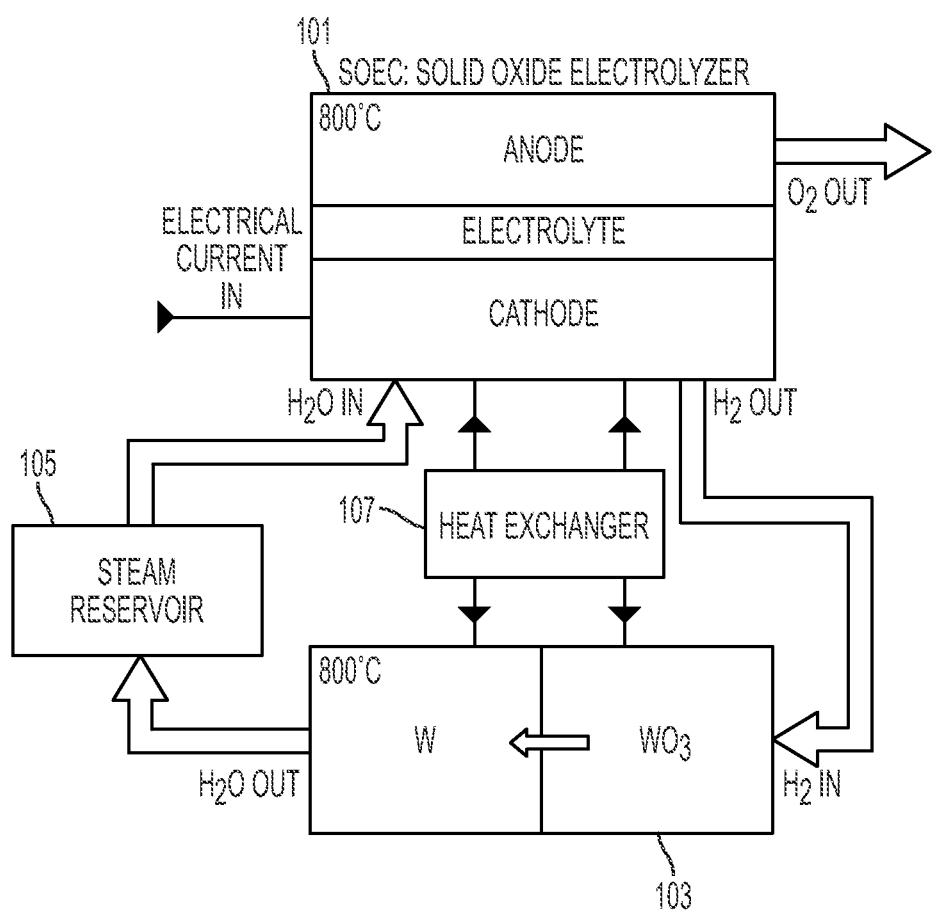
FIG. 1 is a schematic diagram of a system storing electrical energy in accordance with certain embodiments.

Certain embodiments of the present disclosure describes an energy storage system utilizing the conversion of tungsten oxide-containing material into tungsten-containing material to store energy.

Certain embodiments of the present disclosure describes an energy recovery system utilizing the conversion of tungsten-containing material into tungsten oxide-containing material to recover energy.

The tungsten-containing material can include tungsten metal, tungsten containing metal alloy, a metal-ceramic composite containing tungsten metal or one of its alloys, and the like. In certain embodiments, the tungsten-containing material can be metal tungsten particles, supported tungsten (e.g., particles coated with tungsten metal), tungsten particles supported on an inert metal or ceramic foam, and the like. For simplicity, tungsten-containing material will be referred herein as W. However, the use of any other forms of tungsten described herein, either alone or in combination thereof, are within the scope of the present disclosure.

The tungsten oxide-containing material can include any form of oxidized tungsten, including and not limited to $WO_3$, a metal or ceramic composite containing tungsten oxide, and the like. In certain embodiments, the tungsten oxide-containing material can be a tungsten oxide particle, supported oxide (e.g., particles coated with tungsten oxide), tungsten oxide particles support on an inert metal or ceramic foam, and the like. For simplicity, tungsten oxide-containing material will be referred herein as $WO_3$. However, the use of any other forms of tungsten oxide described herein, either alone or in combination thereof, are within the scope of the present disclosure.

In some embodiments, the energy storage system and the energy recovery system can be embodied as separate systems. For example, in certain embodiments, the energy stored in the form of W-containing material can be transported to a separate energy recovery system to recover the energy stored in the W-containing material.

In some other embodiments, the energy storage and recovery system can operate as a single system, where the processing conditions are altered to convert the system from a storage system to a recovery system using the same or different components.

Energy Storage System

In certain embodiments, the system stores energy by converting $WO_3$ to W in accordance with reaction (1):

$$WO_3(s)+3H_2(g) \leftrightarrow W(s)+3H_2O(g) \quad (1)$$

Without wishing to be bound by theory, reduction reaction (1) may proceed via the following two intermediate reactions (1a) and (1b):

$$WO_3(s)+H_2(g) \leftrightarrow WO_2(s)+H_2O(g) \quad (1a)$$

$$WO_2(s)+2H_2(g) \leftrightarrow W(s)+2H_2O(g) \quad (1b)$$

In certain embodiments, without wishing to be bound by theory, the conversion between $WO_3$ and $WO_2$ in reaction (1a) may proceed via intermediary oxides $W_{20}O_{58}$ and $W_{18}O_{49}$.

FIG. 1 shows an exemplary energy storage system utilizing an electrochemical electrolyzer 101 to generate $H_2$ from $H_2O$ and electricity. The oxygen ($O_2$) byproduct can be used for heat recovery and/or subsequently sold as pure oxygen gas. Electricity may be received from conventional and alternative energy generating sources, such as power plants, solar energy farms, wind energy farms, and the like. The generated $H_2$ can be supplied to a reducing reactor 103. Reaction of $H_2$ with $WO_3$ leads to generation of $H_2O$ and W. In certain embodiments, the reaction in reactor 103 and the electrolyzer 101 may be endothermic and the heat required can be obtained from the heat exchanger 107 which stores the heat during the recovery cycles as explained in greater detail below. In certain embodiments, at temperatures of operation (discussed in greater detail below), the $H_2O$ can be in the form of steam. The generated $H_2O$ can be stored in a reservoir 105 and at least a part of the $H_2O$ can be recirculated back to the electrochemical electrolyzer 101. The cycle can be repeated until the desired amount of $WO_3$ in the system has been converted/reduced to W. As shown, the electrical current provided to the system at electrolyzer 101 can be stored as energy in the form of W in reducing reactor 103.

Energy Recovery System

In certain embodiments, the system recovers energy stored in W by converting W to $WO_3$ in accordance with oxidation reaction (2):

$$W(s)+3H_2O(g) \leftrightarrow WO_3(s)+3H_2(g) \quad (2)$$

Without wishing to be bound by theory, reaction (1) may proceed via the following two intermediate reactions (1a) and (1b):

$$W(s)+2H_2O(g) \leftrightarrow WO_2(s)+2H_2(g) \quad (2a)$$

$$WO_2(s)+H_2O(g) \leftrightarrow WO_3(s)+H_2(g) \quad (2b)$$

In certain embodiments, without wishing to be bound by theory, the conversion between $WO_3$ and $WO_2$ in reaction (2b) may proceed via intermediary oxides $W_{20}O_{58}$ and $W_{18}O_{49}$.

Figure 2:
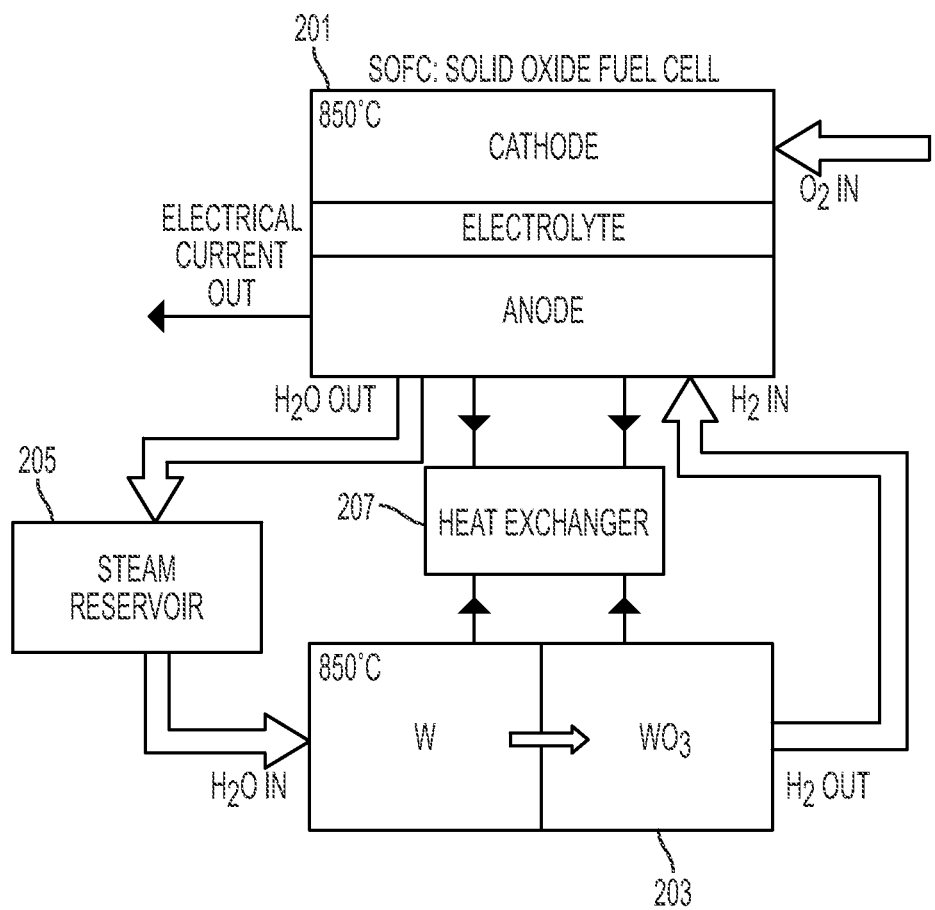
FIG. 2 is a schematic diagram of a system recovery stored energy in accordance with certain embodiments.

FIG. 2 shows an exemplary energy recovery system utilizing fuel cell 201 where the $H_2$ for the fuel cell 201 can be obtained by contacting $H_2O$ (steam) with W in an oxidizing reactor 203. Reaction of W with $H_2O$ generates $H_2$ and $WO_3$. In certain embodiments, the reaction in the reactor 203 and the fuel cell 201 may be exothermic and the heat generated by the fuel cell 201 and the reactor 203 can be stored in the heat exchanger 207. The generated $H_2$ can be provided to the fuel cell 201 along with $O_2$ to generate electricity and $H_2O$. In certain embodiments, at temperatures of operation (discussed in greater detail below), the $H_2O$ can be in the form of steam. $H_2O$ can then be stored in reservoir 205 and at least a part of the $H_2O$ can be recirculated back to the reactor 203 for further generation of $H_2$. The generated electricity can be provided to a power grid for distribution or directly to the customers. As shown, the energy stored in W can be recovered by releasing $H_2$ which in turn can be used for generation of electricity by the fuel cell 201.

In certain embodiments, the energy recovery system need not employ a fuel cell to use the hydrogen but the hydrogen recovered by reacting steam with the W-containing material can be combusted to use its thermal energy for energy conversion. For example, electrical energy can be stored in the form of W as described above. The W can then be transported to desired locations where W is reacted with steam to form $WO_3$ and generate the hydrogen needed for energy conversion.

Energy Storage/Recovery Reactor

In certain embodiments, the reactor may be designed as powder beds containing particles of tungsten-containing and/or tungsten oxide-containing materials. In certain embodiments, to increase the rate of reaction, multiple shallow powder bed may be stacked together, where each powder beds are separated with gas channels. In certain embodiments, extremely attractive rates in a compact bed area can be obtained for rapid response energy-storage in the minutes to hour range.

Reversible Solid Oxide Electrochemical Cells (RSOEC)

Figure 1A:
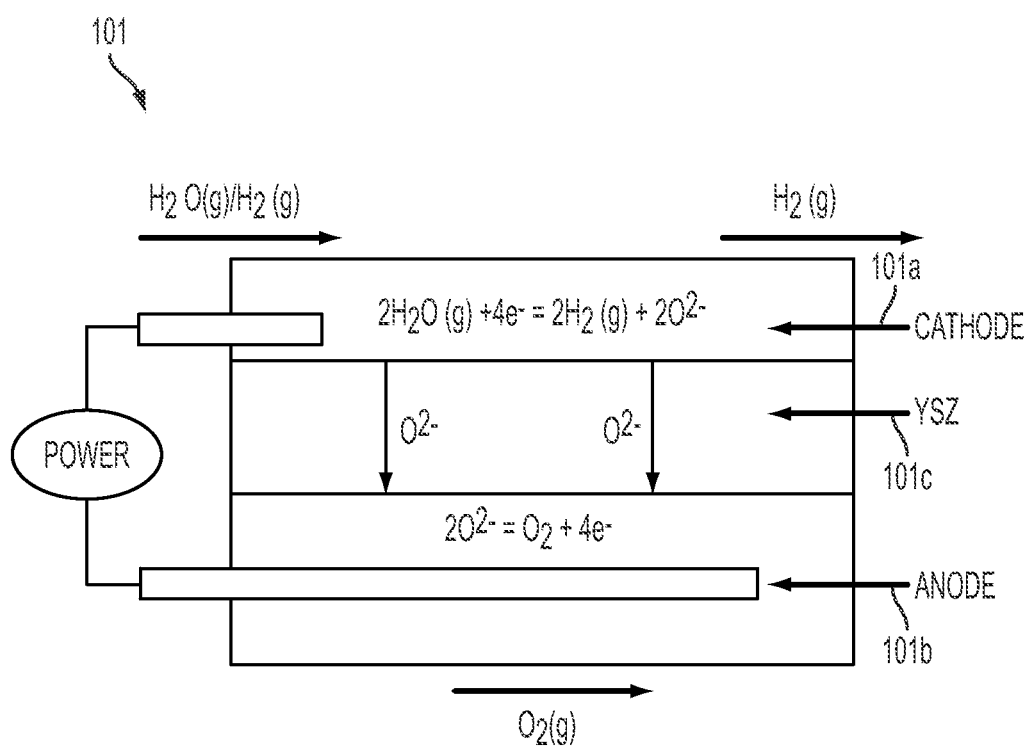
FIG. 1A is a schematic diagram of an electrolyzer in accordance with certain embodiments.

FIG. 1A shows an exemplary electrolyzer 101 that includes a porous cathode 101a (e.g., steam/hydrogen electrode), a porous anode 101b (e.g., oxygen electrode), and a solid electrolyte 101c (e.g., oxygen-ion-conducting solid oxide electrolyte) between the porous electrodes 101a and 101b. In addition, electrolyzer 101 may contain interconnects and suitable seals to contain the gases flowing through electrolyzer 101. In certain embodiments, oxygen electrode (e.g., $La_{1-x}(Sr)_x(Co,Fe,Mn))_{3-\delta}$) may be stable in oxygen/air environments and steam/hydrogen electrode (e.g., $Ni-Zr_{1-x}Y_xO_{2-x/2}$) may be stable in $H_2/H_2O$ reducing environments.

In certain embodiments, electrolyzer 101 can be operated without using expensive noble metal catalysts as the operating temperatures envisioned are sufficiently high enough to allow sufficiently fast kinetics.

As shown in FIG. 1A, water vapor can be electrolyzed at the interface between cathode 101a and electrolyte 101c to form hydrogen in the gas phase and oxygen ions. The oxygen ions can be transported through the electrolyte 101c and oxidized at the anode 101b. As shown in FIG. 1, the hydrogen from electrolyzer 101 can be passed through a reactor 103 (e.g., a thermally coupled $W/WO_3$ porous hot bed) to store the energy as metallic W.

Figure 2A:
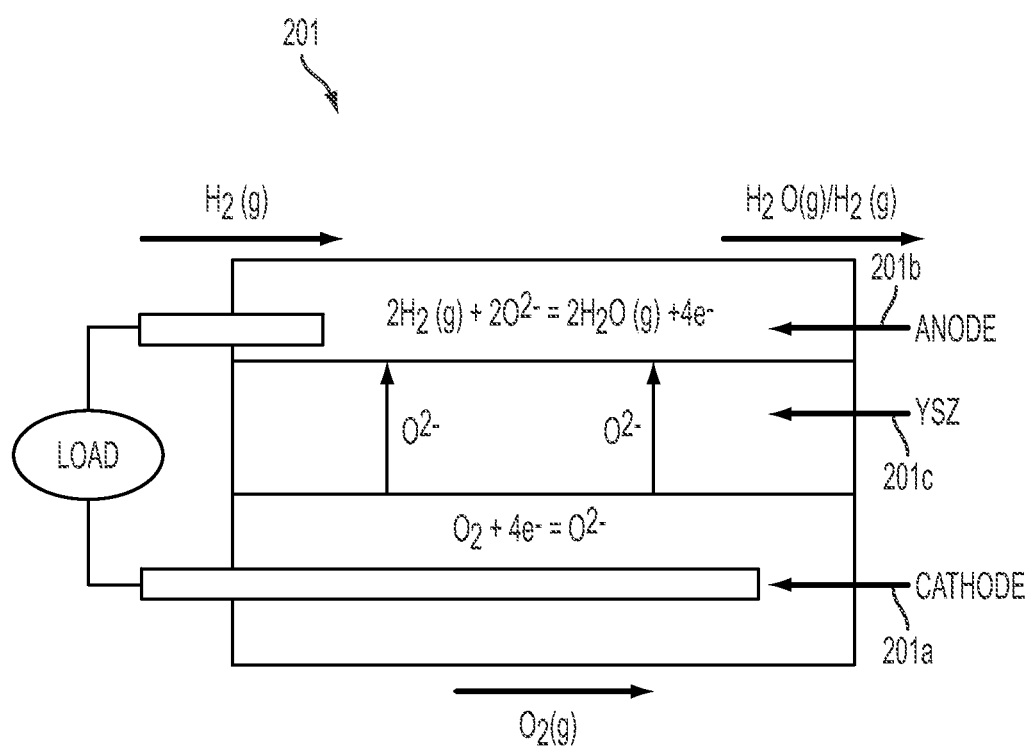
FIG. 2A is a schematic diagram of a fuel cell in accordance with certain embodiments.

FIG. 2A shows an exemplary fuel cell 201 that includes a porous anode 201a (e.g., steam/hydrogen electrode), a porous cathode 201b (e.g., oxygen electrode), and a solid electrolyte 201c (e.g., oxygen-ion-conducting solid oxide electrolyte) between the porous electrodes 201a and 201b. In addition, fuel cell 201 may contain interconnects that are used to connect two or more fuel cells in series (e.g., cathode of one cell is connected to the anode of the next cell) and suitable seals to contain the gases flowing through the fuel cell 201.

In certain embodiments, fuel cell 201 can be operated without using expensive noble metal catalysts as the operating temperatures envisioned are sufficiently high enough to allow sufficiently fast kinetics.

As shown in FIG. 2A, oxygen gas can be converted to oxygen ions at the cathode 201a. The oxygen ions can be transported through the electrolyte 201c and reacted with hydrogen gas at the interface between electrolyte 201c and anode 201b to generate electricity and H$_2$O (e.g., steam). As shown in FIG. 2, the H$_2$O from fuel cell 201 can be passed through the reactor 203 (e.g., a thermally coupled W/WO$_3$ porous hot bed) to regenerate hydrogen for the fuel cell and the desired amount of chemical potential energy from W is recovered as electrical energy.

Table 1 below shows some exemplary materials that can be utilized as the various different components in electrolyzer 101/fuel cell 201.

TABLE 1

| Component | Materials |
| --- | --- |
| Electrolyte (dense; 10-20 μm thick) | $Zr_{1-x}Y_xO_{2-x/2}$ |
| Steam/hydrogen electrode (~30% porous; 1 mm thick) | Ni—$Zr_{1-x}Y_xO_{2-x/2}$ (nickel-yttria stabilized zirconia) |
| Oxygen electrode (~30% porous; ~40 μm thick) | $La_{1-x}(Sr)_x(Co,Fe,Mn)O_{3-\delta}$ |
| Interconnect/bi-polar plate (dense; ~2 mm thick) | Chromium based alloys/stainless steel/ceramics |
| Seals | Glass/mica |

Electrolyzer 101 and fuel cell 201 can be a single component when a combined energy storage and recovery system is utilized. For example, electrolyzer 101 and fuel cell 201 can be employed as a single reversible solid oxide electrochemical cell (RSOEC), such as a reversible solid oxide fuel cell.

RSOEC can be produced using any number of techniques. One exemplary method for producing RSOEC can involve sequential deposition of the various components in the green state followed by a single co-firing step. (See Yoon et al., "Cost-effective single step co-firing process for manufacturing solid oxide fuel cells (SOFCs) using high shear compacting (HSC)TM anode," *Journal of Fuel Cell Science and Technology*, 7(2), 2010, the contents of which is incorporated by reference herein in its entirety.) Such a fabrication process is schematically summarized in FIG. 3.

Figure 3:
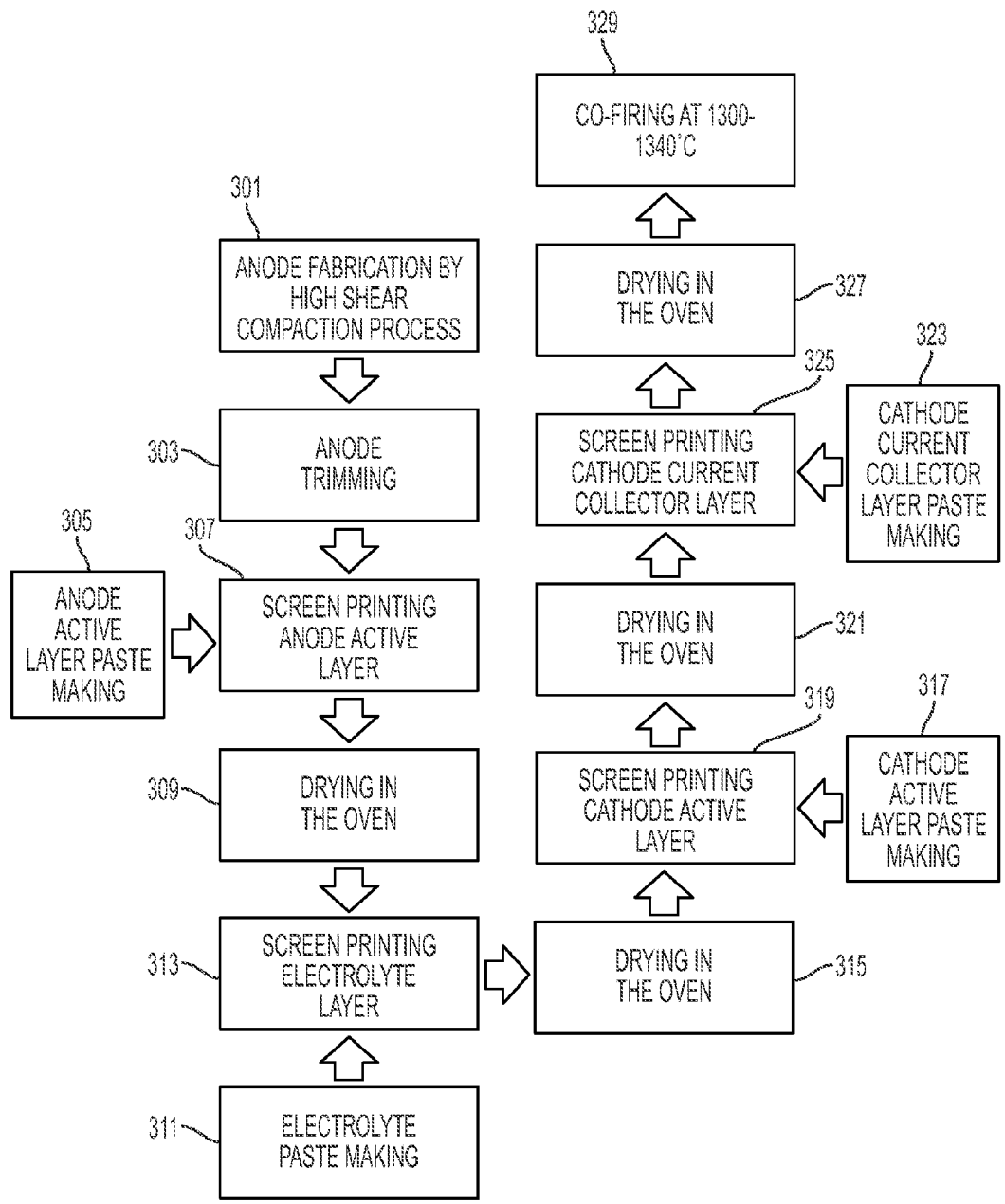
FIG. 3 is a schematic diagram illustrating the steps of forming a solid oxide fuel cell in accordance with certain embodiments.

As shown in FIG. 3, the process includes anode fabrication by high shear compaction process (301). The anode is trimmed (303). Meanwhile, anode active layer paste is made (305) which is then screen printed to form an anode active layer (307). This is followed by a drying process (e.g., in the oven) (309). Meanwhile, electrolyte paste is made (311) which is then screen printed to form an electrolyte layer (313). Another drying process (e.g., in the oven) is carried out (315). Meanwhile, cathode active layer paste is made (317) which is then screen printed to form a cathode active layer (319) followed by another drying process (321). Meanwhile, cathode current collector layer paste is made (323) which is then screen printed to form a cathode current collector layer (325). This is followed by another drying process (e.g., in the oven) (327). Then, the entire electrochemical cell can be co-fired in a single step at a suitable temperature (e.g., 1300-1340° C.) (329).

The process can be considered continuous in the sense that the movement of product passes through various temperature zones. Moreover, burnout of binder and other organic additives can occur in the initial zones where the temperature is less than 600° C., and the temperature can be ramped up to 1300° C. for sintering in one single step. Combining multiple depositions and firing steps into a single co-firing step is expected to significantly reduce manufacturing cost.

Figure 4:
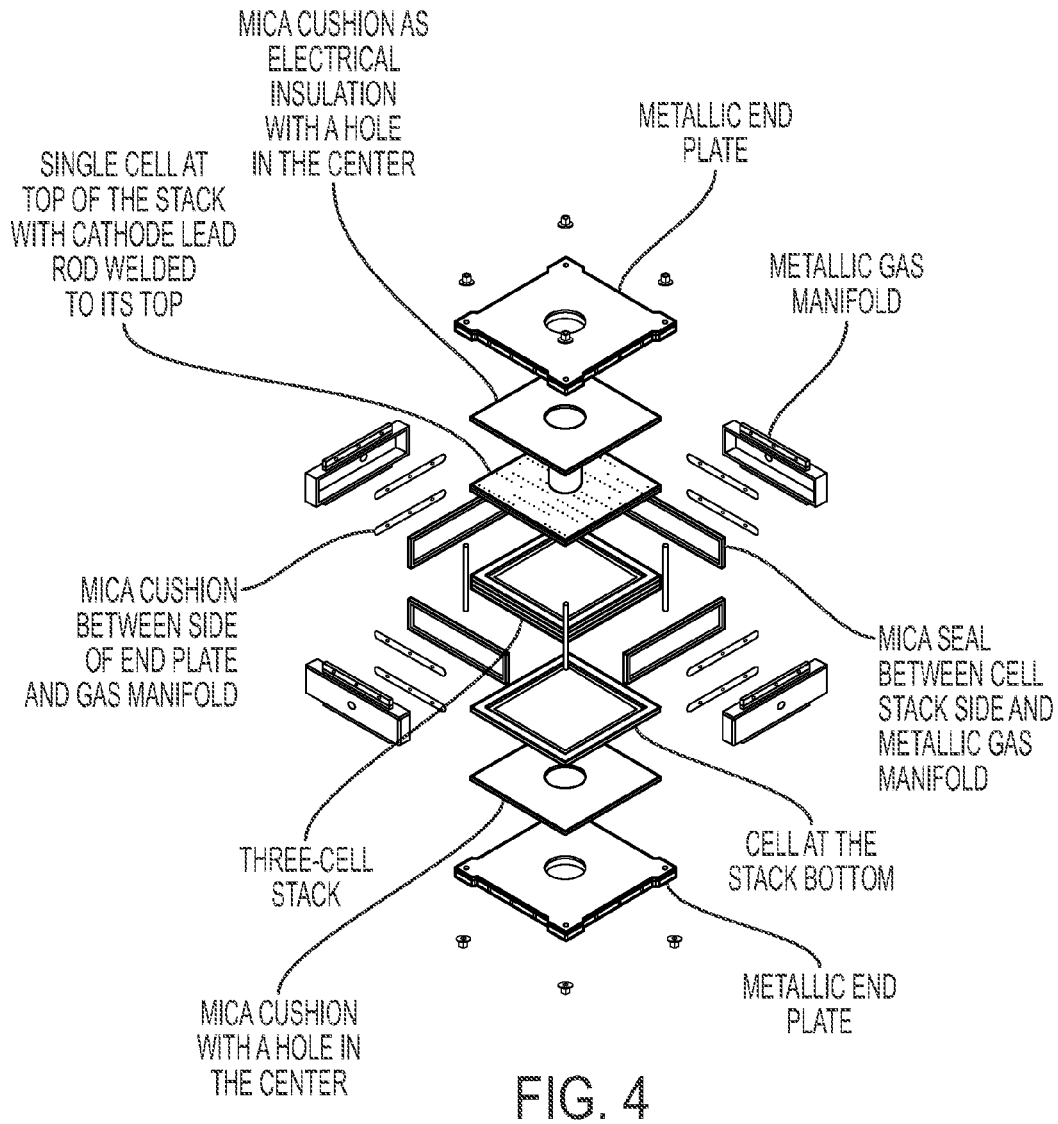
FIG. 4 is a schematic diagram of a three-cell stack assembly electrochemical cell in accordance with certain embodiments.
Figure 5:
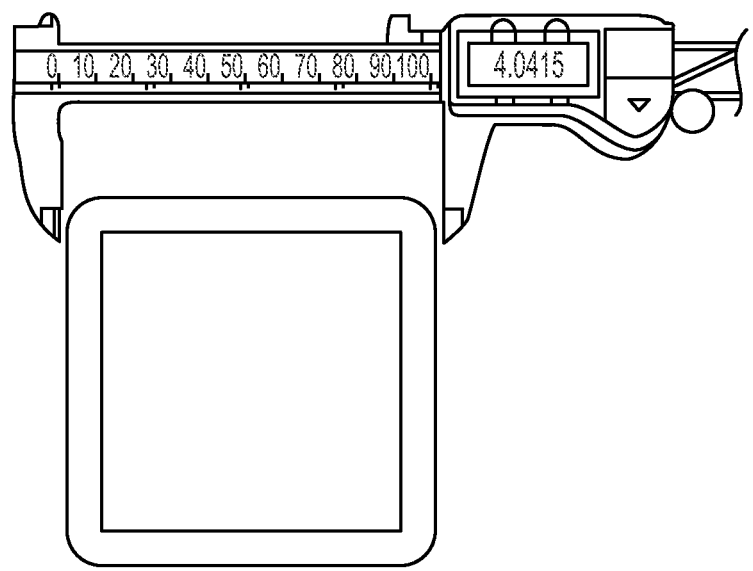
FIG. 5 are images of co-fired solid oxide electrochemical cell and its microstructure in accordance with certain embodiments.
Figure 5:
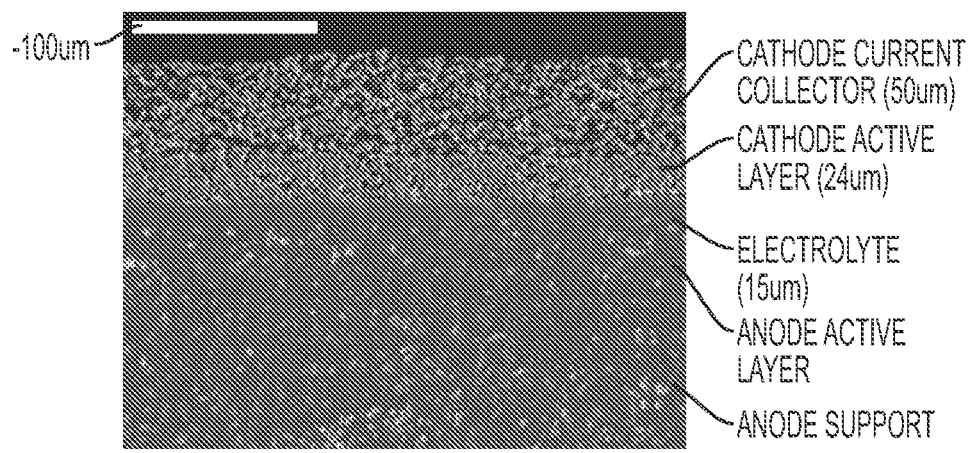

Exemplary RSOECs produced in accordance with FIG. 3 are shown in FIGS. 4 and 5. When such RSOECs are operated as fuel cells in the temperature range of about 700-800 ° C., power of up to about 1.4 W/cm$^2$ can be obtained at about 800° C.

Figure 6:
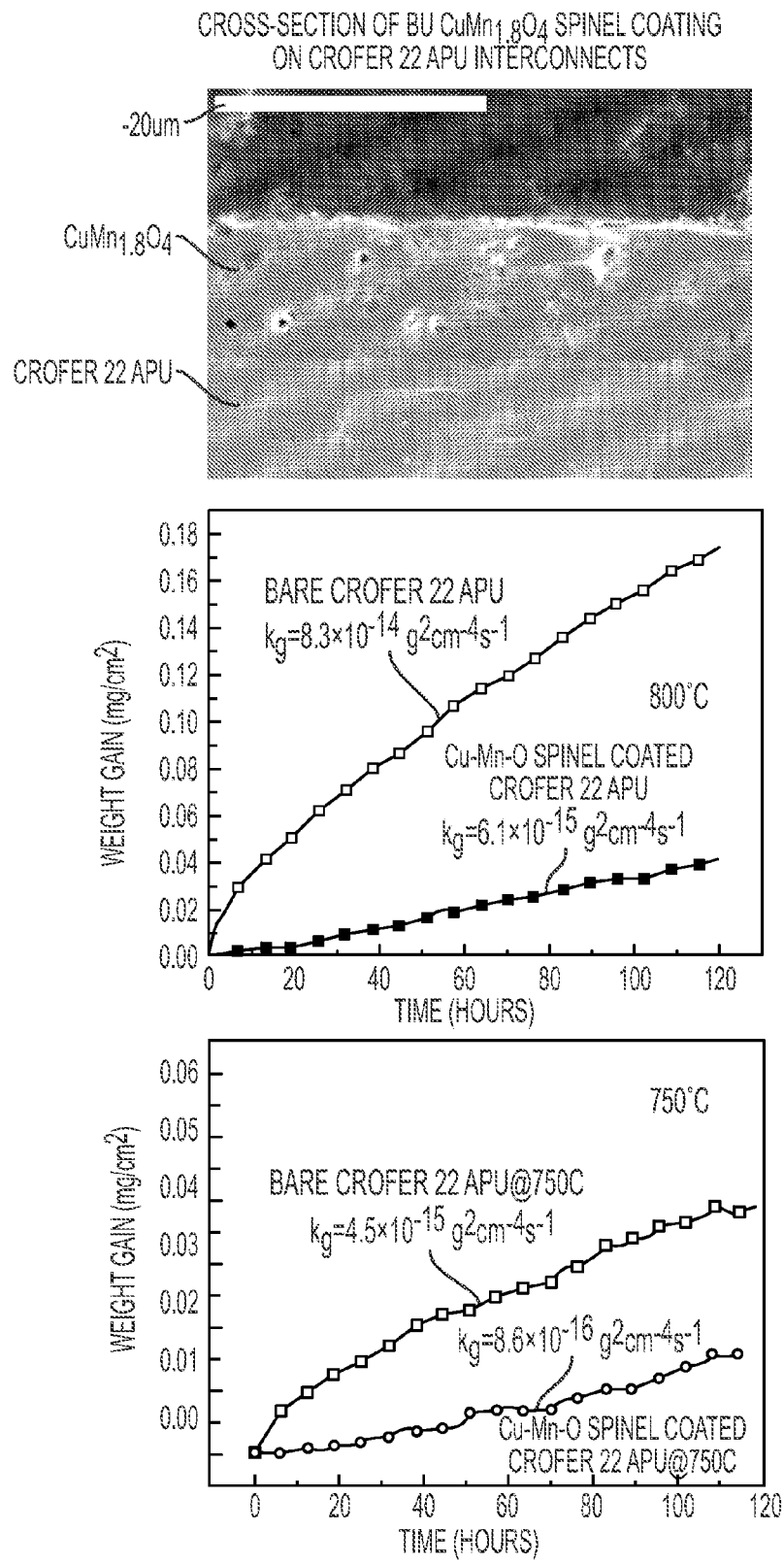
FIG. 6 shows an image elecgtrophoretically deposited spinel coating on the interconnect (Crofer 22 APU) and graphs showing weight gain as a function of time at 800° C. and 750° C. with and without the spinel coating in accordance with certain embodiments.

Additional improvements to the RSOEC can be made. For example, improved interconnect performance can be obtained by depositing spinel coatings as described in Huang et al., "Evaluation of electrophoretically deposited CuMn1.804 spinel coatings on Crofer 22 APU for solid oxide fuel cell interconnects," J. Electrochemical Society, 155(11), p. B1161, (2008), the contents of which is incorporated by reference herein in its entirety, and as shown in FIG. 6. For example, the spinel coating may aid in reducing or preventing oxidation of the interconnect to extend its life.

Figure 7:
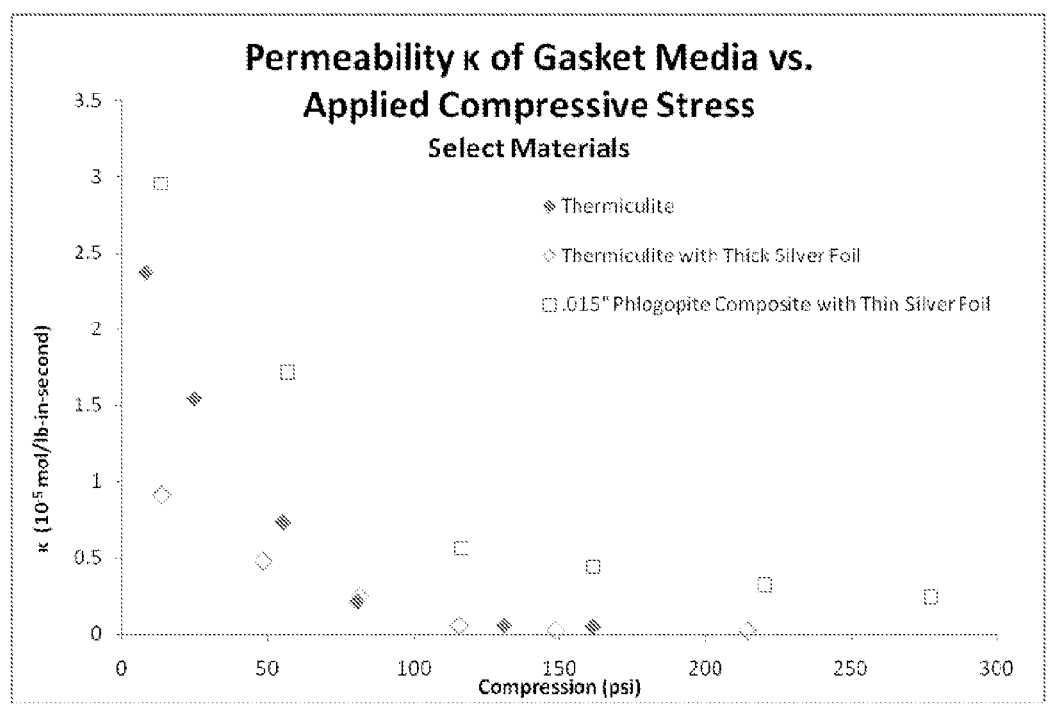
FIG. 7 shows a graph of the permeability of gasket media as a function of applied compressive stress for thermiculite, thermiculite with thick silver foil, and phlogopite composite with thin silver foil demonstrating that the thermiculite with thick silver foil provides the best seal in accordance with certain embodiments.

Other improvements to the sealing material by utilizing particular types of mica, compressive forces, and the like are shown in FIG. 7. In certain embodiments, seals can aid in reducing or preventing anodic and cathodic gas mixing thereby increasing efficiency. In certain embodiments, when the electrodes are stable in their respective gas environments (e.g., anode is stable in oxygen/air environment and cathode is stable in steam/hydrogen environment), seals can also increase the life of the electrodes by reducing or preventing exposure of the cathodes to environments that would render the electrodes to become unstable.

Efficiency

Figure 8:
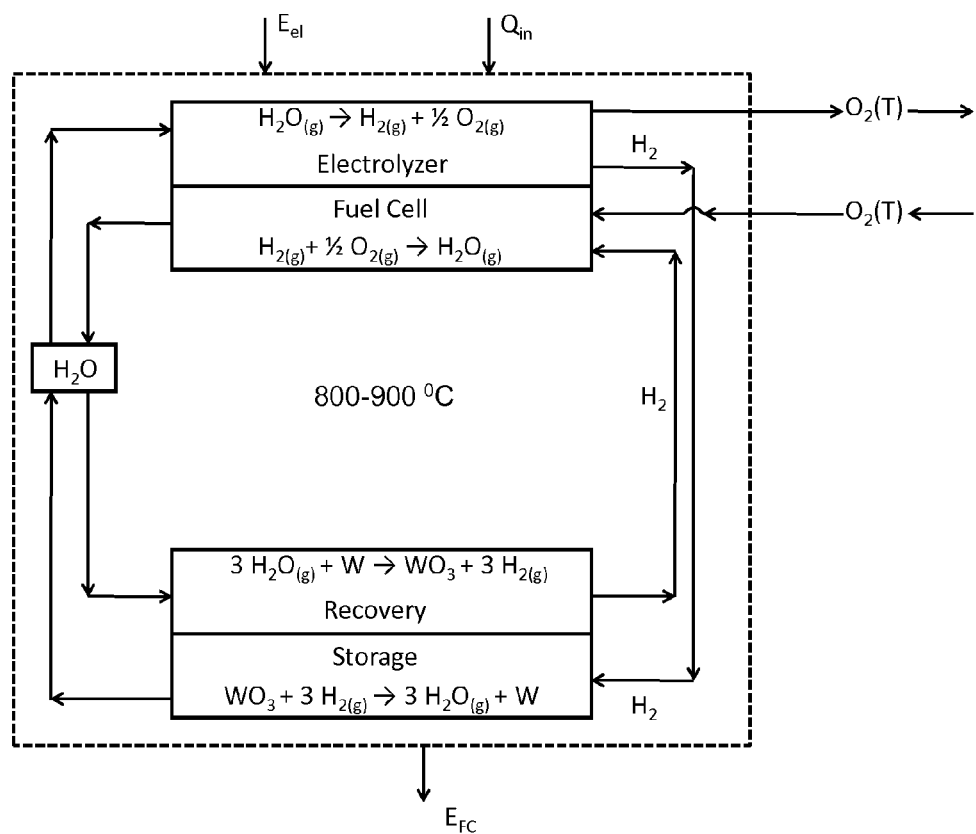
FIG. 8 shows a schematic diagram of a system integrating solid-state energy storage and recovery with electrochemical energy conversion in accordance with certain embodiments.

Taking an exemplary combined energy storage and recovery system shown in FIG. 8, the overall energy efficiency per cycle of charge and discharge can be expressed as:

$$\eta = \frac{E_{FC}}{E_{el} + Q_{in}}$$

where $E_{FC}$, $E_{el}$, and $Q_{in}$ are electrical energy produced by the fuel cell, electrical energy consumed by the electrolyzer, and the net thermal energy consumed by the system, respectively. The efficiency may depend on the current density (rate of energy stored/produced), polarization losses in the electrochemical cell, and the recovered heat from the fuel cell.

For current densities in the range of 0.25 A/cm$^2$ to 0.5 A/cm$^2$, assuming typical polarization losses found in state of the art solid oxide electrochemical cells, 80% heat recovery from the fuel cell and the energy recovery system (run under exothermic conditions), the overall energy efficiency is expected to be about 75% to about 85%.

Operating Conditions

The operating conditions (e.g., temperature, pressure, and the like) of the energy storage and recovery system disclosed herein can be selected such that the energy storage reactions (see reaction (1)) are endothermic and the energy recovery reactions (see reaction (2)) are exothermic.

In certain embodiments, the operating conditions can be selected such that energy storage and recovery reactions (see reactions (1) and (2)) can be thermally integrated with the operating requirements or preferred operating conditions of the elecrolyzer 101 and the fuel cell 201.

In certain embodiments, the W/WO$_3$ material may be used as loosely compacted powder beds that can allow the reactant and product gases to easily penetrate and leave the powder bed, respectively, without significant gas-phase mass transfer hindrance. In certain embodiments, the particle size can be selected to be small (e.g., smaller than 10 mm, 7.5 mm, 5 mm, 3 mm, 2.5 mm, 2.0 mm, 1.8 mm, 1.5 mm, 1.3 mm, 1.0 mm, 0.5 mm, and the like) so that when the gas flow rate employed is beyond the starvation limit (e.g., more reactant is supplied than used), the diffusion of the gas through the thin solid product layer surrounding the underlying reactant material in the particle is faster than the oxidation/reduction reactions so that the reaction is not controlled by diffusion or mass transfer.

In certain embodiments, the operating conditions can be selected as to avoid change of physical shape and size of the W/WO$_3$ materials. For example, the operating conditions can be selected as to avoid sintering of the W/WO$_3$ materials. For example, W has a melting point of about 3422° C. and WO$_3$ has a melting point of about 1475° C. and operating temperatures that are below the melting points of the W/WO$_3$ can be selected.

In certain embodiments, particularly when a reversible solid oxide fuel cell is utilized as both an electrolyzer 101 and fuel cell 201, the operation conditions can be selected so that the operating temperatures are similar to allow rapid switching between the recovery and storage conditions. For example, switching times of less than 30, less than 20, less than 15, less than 10, less than 5, or even less than 1 minute may be achieved.

In certain embodiments, the operating conditions can be selected such that the energy storage and recovery reactions (reactions (1) and (2)) do not encounter a significant thermodynamic barrier. Generally, reactions are considered thermodynamically favorable when the change in free energy is negative and thermodynamically unfavorable when the change in free energy is positive. Generally, change in free energy for a particular chemical reaction is positive in one direction and negative in the reverse direction. Accordingly, reactions typically proceed in one direction and not the reverse as the reverse direction encounters a large thermodynamic barrier to proceed. Hence, the operating conditions (e.g., temperatures and pressures) can be selected such that the free energy change ($\Delta G°$) of the storage and recovery reactions (reactions (1) and (2)) are both near zero. Particularly, when the operating conditions are selected so that the change in free energy ($\Delta G°$) of the reactions is near zero, the system may have 50% conversion of the gas passing through the system during both the energy storage and recovery cycle.

In certain embodiments, the operating temperatures can be selected to be between 600° C. to 1000° C., such as 700° C. to 900° C., or 750° C. to 850° C., or between 800° C. to 850° C. Particularly, the following change in free energy of reactions can be calculated (see Table 2), showing that under theoretical conditions, temperature of 823° C. can provide a change in free energy of about zero.

TABLE 2

| Temperature | $\Delta G°$ of reaction (1) (Energy Storage) | $\Delta G°$ of reaction (2) (Energy Recovery) |
| --- | --- | --- |
| 700° C. | 10 kJ | −10 kJ |
| 800° C. | 1.8 kJ | −1.8 kJ |
| 832° C. | 0 kJ | 0 kJ |
| 850° C. | −1.9 kJ | 1.9 kJ |
| 1000° C. | −12 kJ | 12 kJ |

None of these important operating conditions and material choices were recognized by the conventional art. For example, U.S. Pat. No. 5,492,777 proposed using Fe/FeO system to store and recover energy. However, such a system poses numerous disadvantages not recognized therein. For example, the change in free energy ($\Delta G°$) of the energy storage reaction at temperatures between 700° C. to 1000° C. is between never zero (6.8 kJ/mole of Fe to 3.7 kJ/mole of Fe, respectively). Accordingly, the energy storage reaction is not as efficient and the electrolyzer will need to be larger and operate at lower current density, as compared to the system of the present disclosure. Second, at 1380° C., the change in free energy ($\Delta G°$) of the energy storage reaction is near zero, but such a temperature will not efficiently operate the fuel cell and thermal integration of the electrolyzer/fuel cell will be difficult. Third, the melting point of FeO is 1377° C., which will likely promote sintering of the oxide above 800° C. and impeded cycling between the Fe and the FeO during the storage and recovery cycles.

Advantages

The energy storage/recovery systems of the present disclosure provide several distinct advantages over the conventional art.

First, energy storage/recovery systems of the present disclosure allows storage of energy in the form of W, rather than the dangerous form of hydrogen gas. Hence, safety is promoted.

Energy storage/recovery systems of the present disclosure provides high efficiency when combined with heat recovery from the fuel cell and the energy recovery system that is operated under exothermic conditions.

Energy storage/recovery systems of the present disclosure can achieve a high volumetric energy density compared to conventional art. For example, the energy storage/recovery systems of the present disclosure can achieve a volumetric energy density of about 21 kWh/l of W. This value is roughly three times higher than the value for the Fe/FeO system of about 8 kWh/l of Fe.

Energy storage/recovery systems of the present disclosure can achieve an efficient energy capacity compared to conventional art. Assuming a cost of $35/kg of W and specific gravity of W to be about 19 g/cm$^3$, this translates to an energy capacity related cost of about $35/kWh. This is significantly lower than a recently announced government (ARPA-E) cost target of $100/kWh.

Energy storage/recovery system of the present disclosure can also be deployed as a compact, modular, and scalable system (from tens of kW to several MW). Scalability can be achieved by utilizing a series of desired components and/or size-scaled components (e.g., electrolyzer, fuel cell, reservoir, reducing reactor, oxidizing reactor, etc.).

Energy storage/recovery system of the present disclosure can also respond rapidly to changing power demands. For example, because the RSOEC can be operated at operating conditions where change in free energy is zero in both directions, RSOEC can rapidly change between functioning as an electrolyzer and a fuel cell.

EXAMPLES

Example 1

Kinetics

In this example, reducing reactor/oxidizing reactor for W/WO$_3$ is modeled as a loosely compacted shallow powder bed. This allows the reactant and product gases to easily penetrate and leave the powder bed, respectively, without any gas-phase mass transfer hindrance. This is expected to result in a bed where the resistance to both molecular, as well as Knudson diffusion of the gas can be neglected. Furthermore, if the particle size is small and the gas flow rate employed exceeds the starvation limit, the diffusion of the gas through the thin solid product layer surrounding the solid reactant particle and the mass transfer steps in the gas phase would be much faster compared to the chemical reaction.

Figure 9:
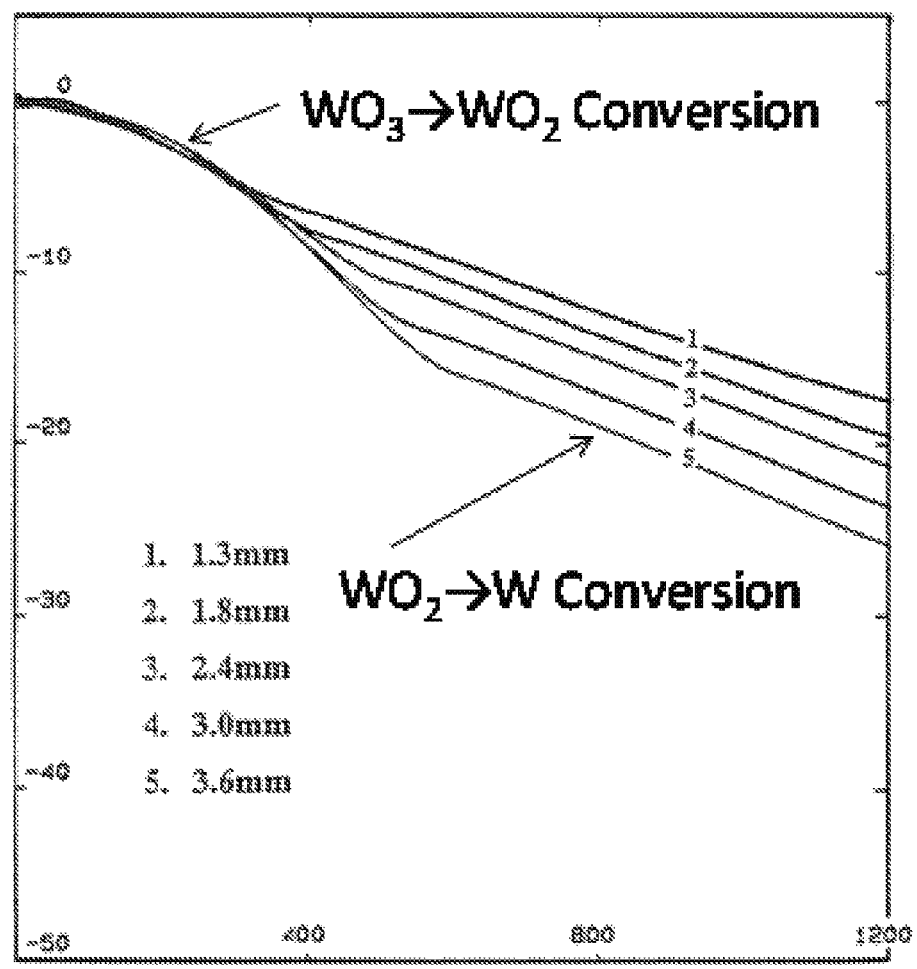
FIG. 9 shows a chart of bed height as a function of time at 1073K showing the reduction of $WO_3$ to W where the top surface was exposed to $H_2(g)$ 0.5 $cm^2$ in accordance with certain embodiments.

Under these conditions, the conversion between the $WO_3$/$WO_2$ can occur in the entire shallow powder bed and that between the $WO_2$/W occurs as a moving front through the shallow powder bed. As shown in FIG. 9, the reaction between the $WO_3$ and the $WO_2$, involving the intermediate oxides $W_{20}O_{58}$ and $W_{18}O_{49}$, is slightly variable with time. But the reaction rate responsible for the conversion between the $WO_2$/W is larger and constant, and proceeds as a moving front until completion of the reaction. From the kinetics data shown in FIG. 9, it can be estimated that a 3.5 mm $WO_3$ powder bed will store hydrogen energy (based on HHV of $H_2$) at the rate of about 10 kWh/m$^2$-hr. The plots also show that the rate increases as the powder bed height increases; rate doubles when bed height is increased by three times.

Nevertheless, a more effective way of increasing the rate may be to design the storage unit by stacking the shallow powder beds and separating them with gas channels. Clearly extremely attractive rates in a compact bed area can be obtained for rapid response energy-storage in the minutes to hour range.

Example 2

Modelling of Power Bed

The overall reduction reaction $$WO_3(s) + 3H_2(g) = W(s) + 3H_2O(g)$$

can be represented as follows:

$$bB(s) + A(g) = fF(s) + eE(g)$$

Figure 10:
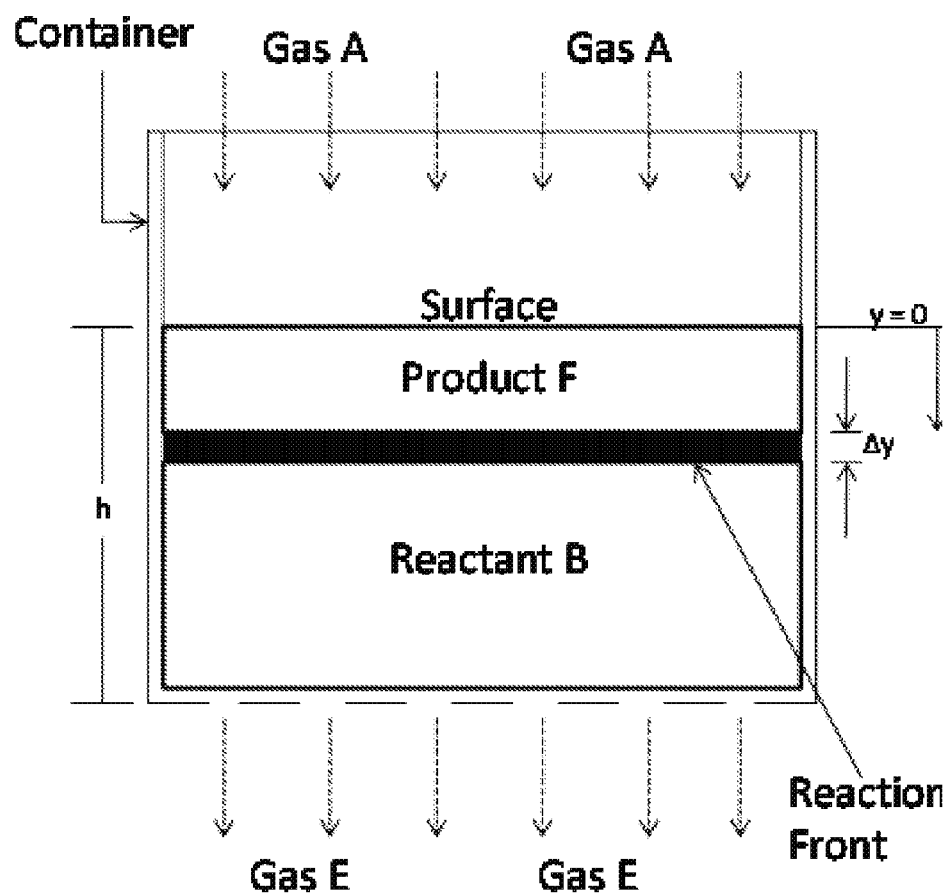
FIG. 10 shows a schematic diagram of a moving reaction front during gas-solid reaction in accordance with certain embodiments.

In such instance, the moving reaction front for the conversion of $WO_2$/W in the shallow powder bed can be schematically depicted as shown in FIG. 10, and assuming a first-order reaction kinetics, the velocity of the moving reaction interface can be modeled as:

$$v = \frac{dy}{dt} = \frac{2nbM_B kC_A}{\rho}$$

where n is the average number of horizontal rows of the small particles building up the reaction front, $\rho$ is the density of the particle, $M_B$ is the molecular weight of B, b is the stoichiometric constant, k is the reaction rate constant, and $C_A$ represents the bulk concentration of gas A. The reaction rate is modeled as:

$$\frac{d\Delta W}{dt} = \Delta W_\infty \frac{2nbM_B kC_A}{h\rho}$$

where $$\Delta W = \frac{W_o - W_t}{W_o}$$

and W represents the weight of the bed at time t, and h is the bed height.

Also, if the reaction is a thermally activated process, and the heat transfer is not rate-controlling (observed for the W/$WO_3$ system), the reaction rate can be described as a function of temperature as:

$$\ln\left(\frac{d\Delta W}{dt}\right) = \ln\left[\Delta W_\infty \frac{2nbM_B k_o C_A}{h\rho}\right] - \frac{Q}{RT}$$

where $k_o$ is the pre-exponential Arrhenius constant and Q is the activation energy of the reaction.

Example 3

Experimental Verification

Experimentally, the velocity and width of the reaction front, the reaction rate constant, the activation energy, and the reaction rate as a function of bed height can be determined. These measurements can be made as a function of particle size, morphology, and the number of energy storage and recovery cycles. The shallow powder bed can be sectioned at different time intervals and the system can be characterized to check the structure of the porous bed and verify model predictions. Two different types of experimental techniques can be used for this investigation.

First, the shallow loose powder bed can be heated to the desired temperature in an inert atmosphere, and then the reaction gas ($H_2$/$H_2O$) can be introduced into the reaction chamber. The weight changes as a function of time can be monitored, for example, under a constant rate of temperature increase. The $H_2$/$H_2O$ inlet mix can be based on what is expected to be coming out of the RSOEC system and can be obtained by bubbling hydrogen gas through a temperature-controlled water bath. The instrument to make such measurements can be a TGA-DSC unit (TA Instruments, SDT Q600).

Second, the dew point of water in the outgoing gas can also be constantly monitored by using an electronic dew point hygrometer and thereby following the reaction rate including the velocity of the reduction front as it proceeds.

The information gathered can help to assess the cyclic stability of the W/$WO_3$ system, select the operating temperature for energy storage and recovery cycles (between 750-950° C.) and design the shallow W/$WO_3$ powder bed as a function of the gas flow rate (or current density of the RSOEC) in order to meet the desired response time.

Example 4

Systems Integration of Energy Storage and Recovery System with the RSOEC Stack

In this example, the electrolyzer and the energy storage ($WO_3 \rightarrow W$) unit is assumed to be operating at 800° C. and the fuel cell along with the energy recovery ($WO_3 \rightarrow W$) unit operating at 850° C. Heat is absorbed by the electrolyzer/energy storage unit and released by the fuel cell/energy recovery unit. Details of the energy and mass balance of the system along with the assumptions made are presented below.

Electrolyzer Efficiency

The reversible fuel cell/electrolyzer and W/$WO_3$ chemical storage system can be thermally integrated into a single system. As has been discussed, the Gibbs free energy change for the reaction: $W(s)+3H_2O\ (g)=WO_3(s)+3H_2(g)$ is nearly zero at 832° C. Thus, close to this temperature (800-850° C.), the composition of the $H_2O$—$H_2$ mixture in equilibrium with the $W(s)$-$WO_3(s)$ mixture is about 50% $H_2O$ (g)-50%$H_2$ (g), and for the purposes of obtaining efficiency estimates, it can be assumed that this is the composition of the gas mixture entering the electrolyzer. It can also be assumed that the composition of the gas mixture exiting the electrolyzer is about 2% $H_2O$-98%$H_2$. Further it can be assumed that the electrolyzer is operated at around 800° C. and that the area-specific resistance of the electrolyzer cell is 0.3 $\Omega \cdot cm^2$. For the purposes of this calculation, the efficiency of the electrolyzer is thus defined as:

$$\varepsilon_{electrolyzer} = \frac{\dot{N}_{H_2,gen} \cdot LHV_{H_2}}{E_{op} \cdot I}$$

Figure 11:
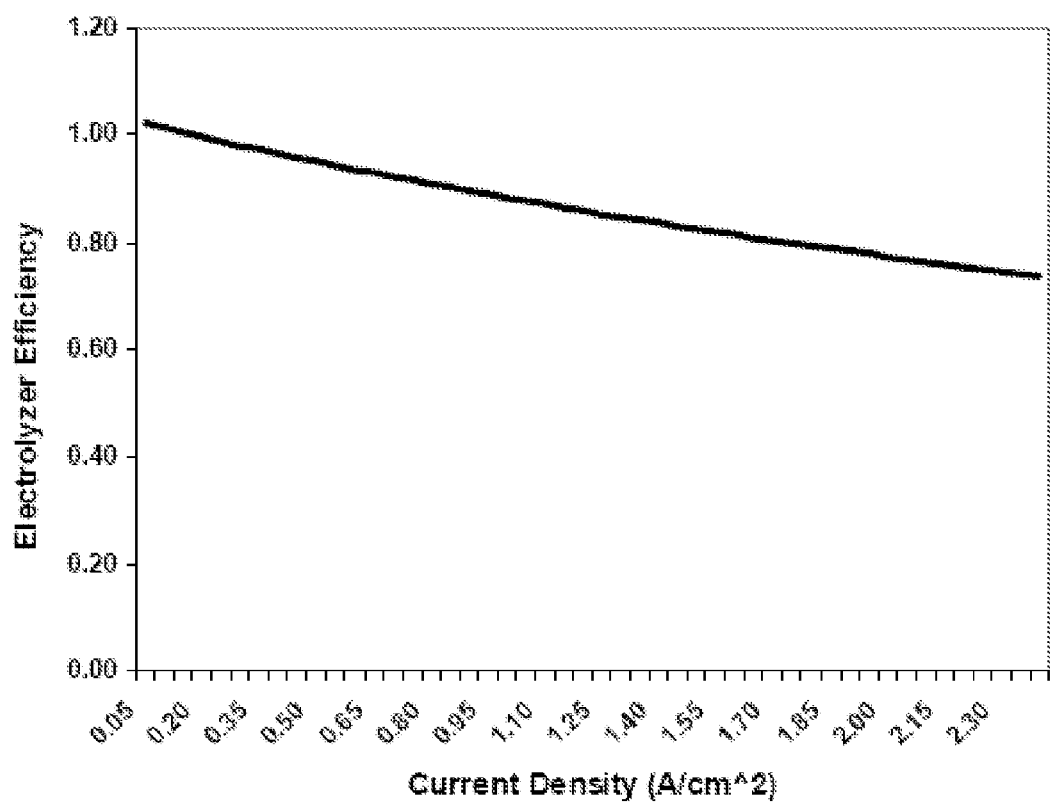
FIG. 11 shows a graph of electrolyzer efficiency as a function of current density in accordance with certain embodiments.

In the above equation, $\dot{N}_{H_2,gen}$ is the hydrogen generated by the electrolyzer, $E_{op}$ the cell operating voltage, I the current density, and $LHV_{H_2}$ the lower heating value of hydrogen. The computed efficiency of the electrolyzer is shown below in FIG. 11 as a function of the current density.

The calculations show that high efficiencies of 115% is obtained when operating the electrolyzer at 250 mA/cm². Efficiencies over 100% in the electrolyzer deserve some explanation. In most cases, such as room temperature water electrolysis, the electrical energy input is larger than the enthalpy change of the reaction, so some energy is released as waste heat. But in the case of electrolysis of steam into hydrogen and oxygen at high temperature, operating below the thermoneutral voltage, the opposite is true. Heat is absorbed from the surroundings, and the heating value of the produced hydrogen is higher than the electric input. Under such conditions, the efficiency relative to electric energy input is greater than 100%; heat absorbed from surrounding is supplied by heat recovered from other exothermic processes as described later in this section.

Fuel Cell Efficiency

Figure 12:
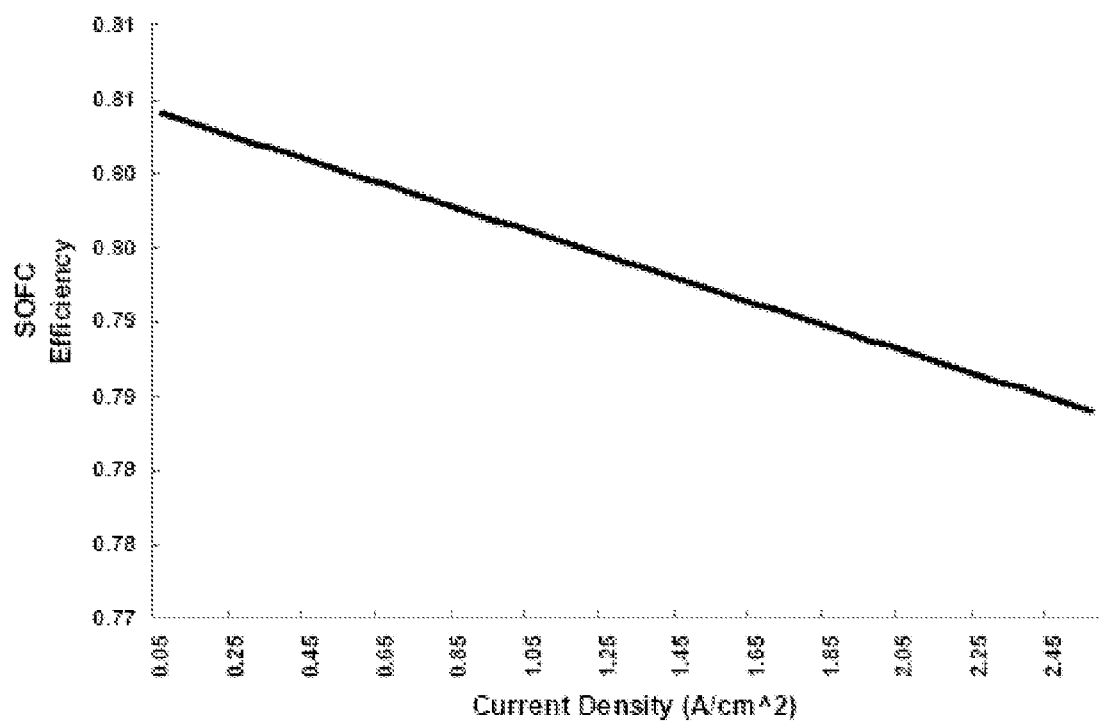
FIG. 12 shows a graph of fuel cell efficiency as a function of current density in accordance with certain embodiments.

During the fuel cell mode of operation, it can be assumed that 90% $H_2O$-10%$H_2$ from the fuel cell enters the $W/WO_3$ storage system, exits the storage system at the same 50% $H_2$—$H_2O$ mixture which is the equilibrium composition at temperatures close to 850° C. and enters the fuel cell at the same operating temperature. In the fuel cell, the efficiency is calculated assuming that the entire electrical energy and the exothermic heat evolution from the chemical reaction and resistive dissipation are the outputs from the system. The computed efficiency of the fuel cell under these conditions as a function of the current density is shown in FIG. 12. The area specific resistance of the SOFC assumed in this calculation is also 0.3 $\Omega \cdot cm^2$ as was in the case of the electrolyzer. In calculating the efficiencies above, the following definition of SOFC efficiency has been used:

$$\varepsilon_{SOFC} = \frac{E_{op} \cdot I + 0.95(T\Delta S - I^2 R)}{\dot{N}_{H_2,consumed} \cdot LHV_{H_2}}$$

In the above definition, it can be assumed that 95% of the heat liberated by the SOFC is captured in the overall process. With these assumptions about the fuel cell and electrolyzer performance, the overall mass and energy flows for a 1 GWh storage and delivery, i.e. storage from a 1 GW grid power being stored for 1 hour, can be obtained.

System Energy and Mass Balance

Based on the efficiencies computed above, an analysis of the proposed process has been performed to evaluate the system mass and energy balance. It can be assumed that the energy storage and recovery system will produce a stream of hydrogen and water vapor with equal partial pressures (50% each) since the free energy change for the storage and the recovery reactions are near zero when it is operating at around 832° C. (800-850° C.); equilibrium constant, $$K_{eq} = \frac{P_{H_2O}}{P_{H_2}} \approx 1.$$

Thus, when the system is operating as a fuel cell, the stream of hydrogen and water vapor with equal molar values can enter the fuel cell. Since the composition of the gas changes between the inlet and exit of both devices, the Nernst potential which is an important thermodynamic parameter in the calculation also changes from inlet to exit of both devices. The operating conditions of the fuel cell and electrolyzer are summarized in Table 3.

TABLE 3

| | Inlet Conditions | Exit Conditions | Operating Current Density |
|---|---|---|---|
| Fuel Cell (T = 850° C.) | 50% $H_2O$<br>50% $H_2$<br>Inlet Nernst: 0.919 V | 90% $H_2O$<br>10% $H_2$<br>Exit Nernst: 0.813 V | 250 mA/cm² |
| Electrolyzer (T = 800° C.) | 50% $H_2O$<br>50% $H_2$<br>Inlet Nernst: 0.936 V | 98% $H_2O$<br>2% $H_2$ | 250 mA/cm² |

Figure 13:
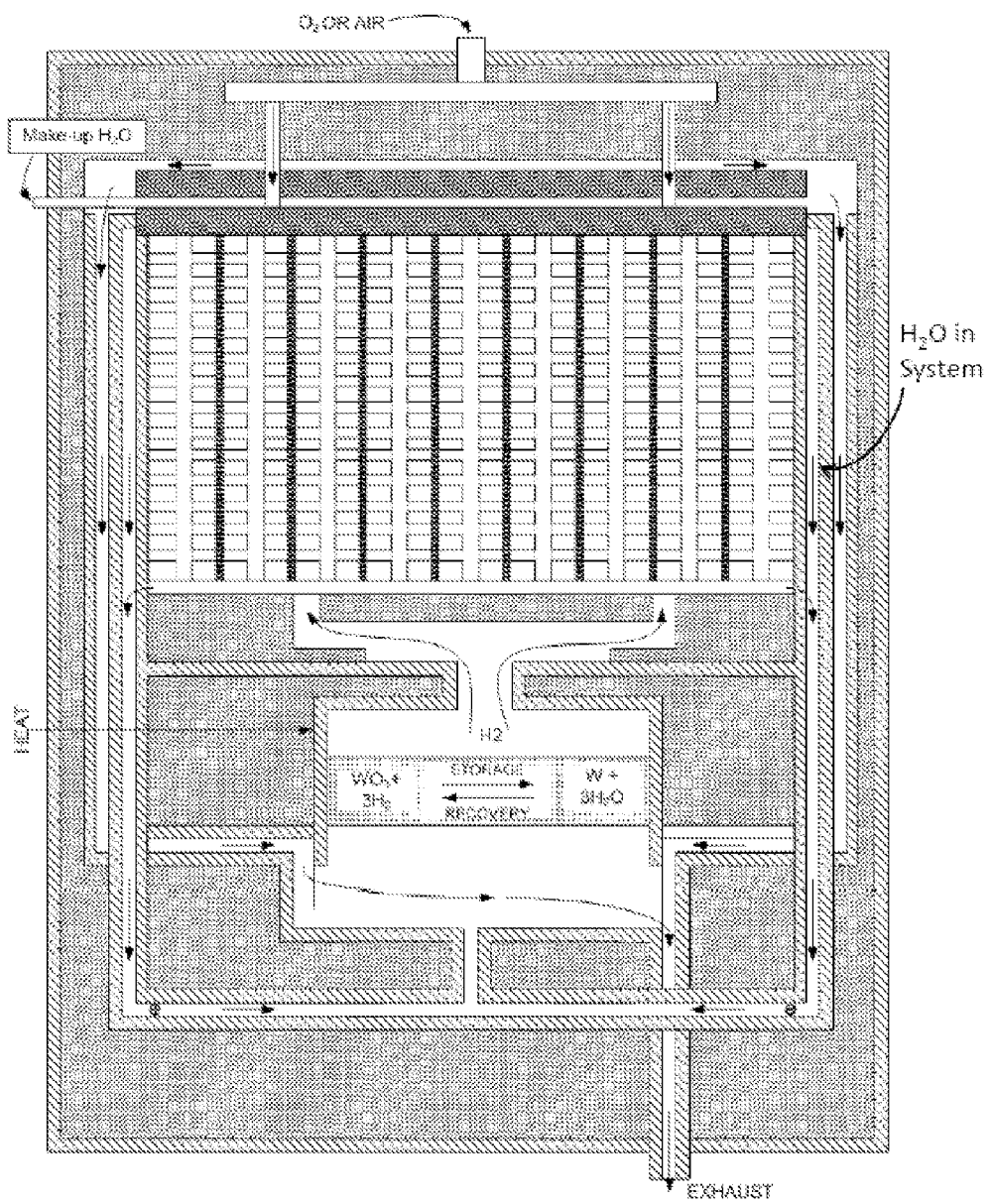
FIG. 13 shows a schematic cross-sectional diagram of a planar reversible solid oxide electrochemical cell (RSOEC) system operating as a fuel cell in accordance with certain embodiments.
Figure 14:
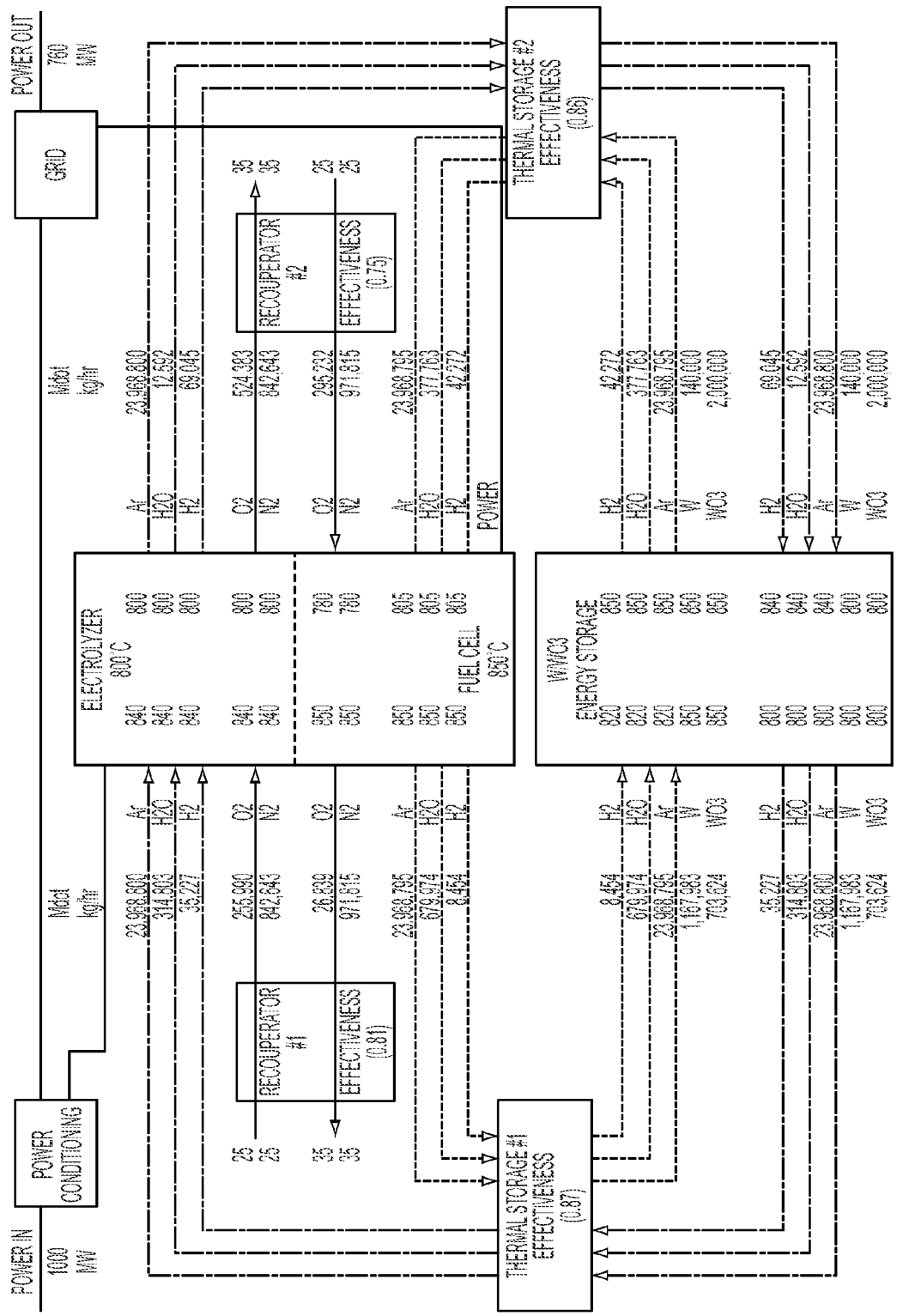
FIG. 14 shows a schematic block diagram showing flows into and out of a system containing an electrolyzer/fuel cell and energy storage/recovery modules in accordance with certain embodiments.

The cross-section of a planar RSOEC system integrated with the solid-state W/WO3 energy storage and recovery system and the block diagram of the entire system are shown in FIG. 13 and FIG. 14, respectively. By cycling the system from charging the storage to discharging it and holding the energy storage mass constant after each full cycle, the overall energy efficiency of the system can be estimated. It can be assumed that there will be 1 GW stored for 1 hour. Then, the system will reverse and produce power for 1 hour. It can be observed that with 1 GWh into the system, that the storage masses remain constant if 760 MWh is produced by the fuel cell. Thus the efficiency of power out to power in is estimated to be 76%. In the above calculation, the fuel cell and the electrolyzer are each assumed to operate at a current density of 250 mA/cm².

FIG. 14 shows an exemplary system containing six components identifying the mass flow. The flows labeled with arrows in the clockwise direction refer to the process when excess power is available and is being stored. The flows labeled with arrows in the counter clockwise direction refer to the process when power is being removed from storage. The energy storage/recovery system contains a bed of tungsten and tungsten oxide. The electrolyzer/fuel cell operates as a power consumer and a power producer depending on the direction of the flow of reactants. There are two recuperators. One to recover energy from the fuel cell air flow output and deliver it to the electrolyzer air flow input, and one to recover energy from the electrolyzer air flow output and deliver it to the fuel cell air flow input. Two thermal storage modules collect energy from water vapor, hydrogen, and argon when the fuel cell is operating and delivers this energy to the electrolyzer when it is operating. The use of argon was selected as a convenient way to represent a heat carrier between the energy storage unit and the fuel cell/electrolyzer.

Figure 15:
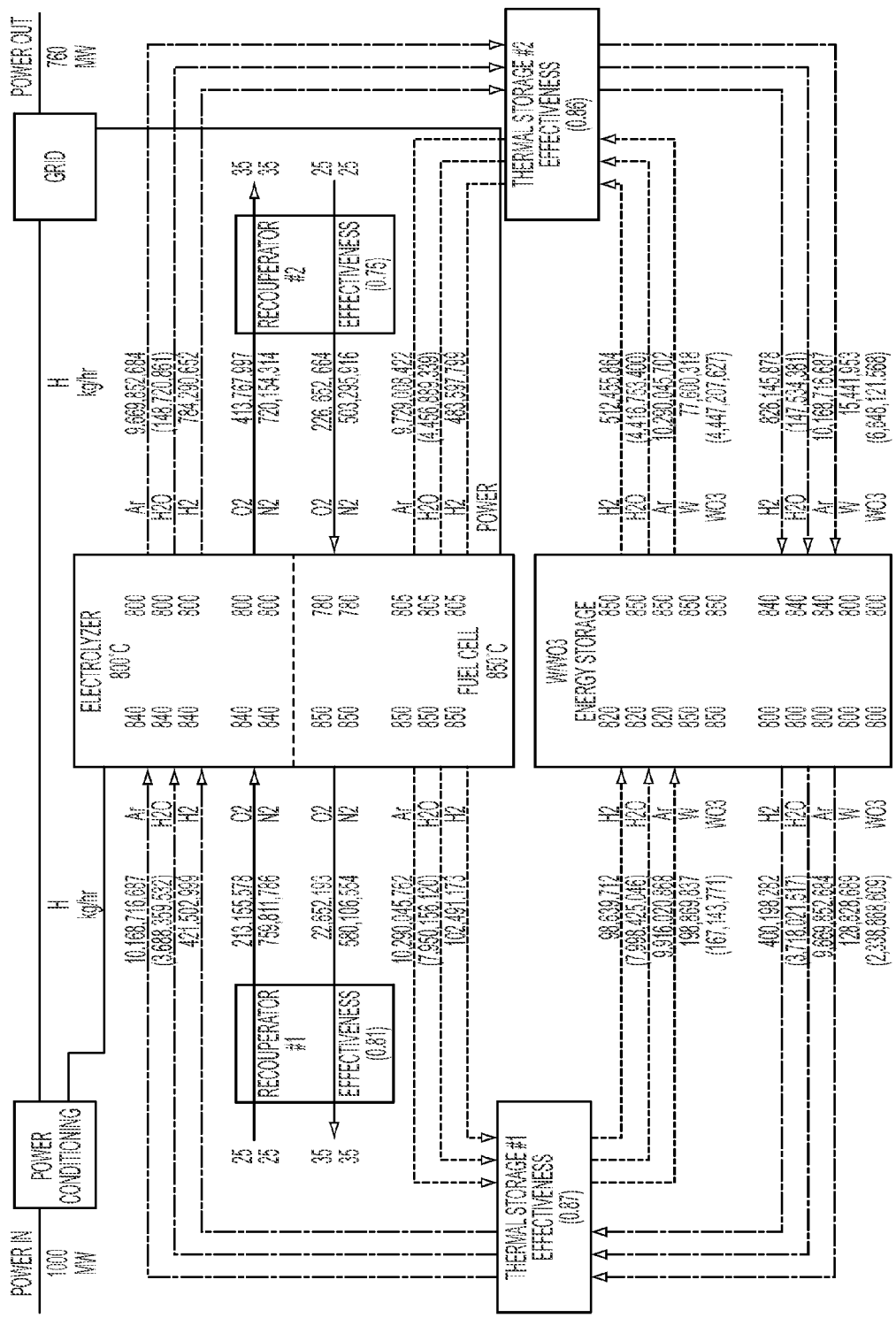
FIG. 15 shows a schematic block diagram showing an energy balance of a system containing an electrolyzer/fuel cell and energy storage/recovery modules in accordance with certain embodiments.

FIG. 15 shows the energy flows in and out of each component based on the best information available to date. The heat storage elements capture energy from heat producing elements during part of the cycle, supplying this energy to the heat absorbing elements during another part of the cycle. Recouperators can be utilized to exchange heat from the fluid streams entering and emanating from the fuel cell/electrolyzer units. Oxygen is assumed to be taken from ambient air during fuel cell operation and returned to ambient air during electrolyzer operation. As shown, these recouperators appear to be capable of supplying quite a bit of the energy required by the electrolyzer. Additional heat is required to be stored from the $W/WO_3$ energy storage device as it is exothermic in the hydrogen production direction and endothermic in the hydrogen consumption direction. Argon is used as a heat transfer fluid in the exemplary model, and the $W/WO_3$ system may store heat in two thermal storage units. Given the temperature range of operation (800-850° C.), example of thermal storage systems include molten salts and eutectics, phase change materials, and insulated pipes containing MgO pellets.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

What is claimed is:

1. An apparatus for storing and recovering electrical energy, the apparatus comprising:
   a reversible solid oxide electrochemical cell (RSOEC) that comprises a porous cathode, a porous anode, and an electrolyte capable of transporting oxygen ions;
   a reactor comprising a powder bed that includes tungsten, tungsten oxide, or combinations thereof;
   wherein the RSOEC is configured to receive electrical energy to electrolyze $H_2O$ to generate $H_2$ and $O_2$ and the reactor is operably connected to the RSOEC to receive the generated $H_2$ and convert tungsten oxide to tungsten thereby storing electrical energy in the form of tungsten; and
   wherein the reactor is configured to receive $H_2O$ to convert tungsten to tungsten oxide and generate $H_2$ and the RSOEC is operably connected to the reactor to receive the generated $H_2$ and generate electrical energy and $H_2O$ thereby recovering electrical energy from tungsten,
   wherein the apparatus further comprises a heat exchanger;
   wherein the heat exchanger is configured to receive heat from the reactor when the reactor receives $H_2O$ to convert tungsten to tungsten oxide and generate $H_2$, and wherein the heat exchanger is configured to receive heat from the RSOEC when the RSOEC generates electrical energy and $H_2O$; and
   wherein the heat exchanger is configured to provide heat to the RSOEC when the RSOEC electrolyzes $H_2O$ to generate $H_2$ and $O_2$, and wherein the heat exchanger is configured to provide heat to the reactor when the reactor converts tungsten oxide to tungsten.

2. The apparatus of claim 1, wherein the reactor generates $H_2O$ when tungsten oxide is converted to tungsten and the RSOEC generates $H_2O$ when electrical energy is generated and the apparatus further comprises a reservoir to store the generated $H_2O$.

3. The apparatus of claim 1, wherein the reactor generates $H_2O$ when tungsten oxide is converted to tungsten and the apparatus further comprises a conduit to recirculate the generated $H_2O$ to the RSOEC.

4. The apparatus of claim 1, wherein the RSOEC generates $H_2O$ when electrical energy is generated and the apparatus further comprises a conduit to recirculate the generated $H_2O$ to the reactor.

5. The apparatus of claim 1, wherein the reactor and the RSOEC are operated at a temperature between about 600° C. to about 1000° C.

6. The apparatus of claim 4, wherein the reactor and the RSOEC are operated at a temperature between about 800° C. to about 850° C.

* * * * *